United States Patent [19]
Monpetit

[11] 3,953,715
[45] Apr. 27, 1976

[54] CONTROL APPARATUS AND PROCESS FOR COMBUSTION ENGINES

[75] Inventor: Louis Monpetit, L'Etang-la-Ville, France

[73] Assignee: Societe des Procedes Modernes d'Injection Sopromi, Clichy, France

[22] Filed: Aug. 1, 1974

[21] Appl. No.: 493,921

[30] Foreign Application Priority Data
Aug. 3, 1973 France .............................. 73.28442

[52] U.S. Cl. ...................... 235/150.21; 235/92 CC; 235/92 T; 235/92 TF; 307/293; 328/48; 328/129
[51] Int. Cl.² ...................... F02D 5/00; G05B 15/02
[58] Field of Search ......... 235/150.21, 92 T, 92 TF, 235/92 FQ, 92 CC, 92 PE; 307/293; 328/129, 48

[56] References Cited
UNITED STATES PATENTS

| | | | |
|---|---|---|---|
| 3,272,970 | 9/1966 | Laycak et al. ................... | 235/92 PE |
| 3,435,196 | 3/1969 | Schmid ........................... | 235/92 CC |
| 3,604,903 | 9/1971 | Hill et al. ......................... | 235/92 CC |
| 3,696,303 | 10/1972 | Hartig ................................ | 328/48 |
| 3,838,397 | 9/1974 | Watson et al. ................... | 235/150.21 |
| 3,840,174 | 10/1974 | Craft .............................. | 235/92 CC |
| 3,846,625 | 11/1974 | Sasayama ....................... | 235/151.21 |

*Primary Examiner*—Felix D. Gruber
*Attorney, Agent, or Firm*—Darby & Darby

[57] ABSTRACT

Method and apparatus for producing a control function signal of a given duration in which a word, or number corresponding to the desired control function is set into a first counter to define a first number of pulses to be counted. A second counter counts a second number of pulses and the two numbers of pulses define two time intervals which are added. A third counter counts a signal representative of the time interval produced by the addition of the two time intervals and a predetermined number of said signals are counted by the third counter to define the duration of the control signal.

5 Claims, 1 Drawing Figure

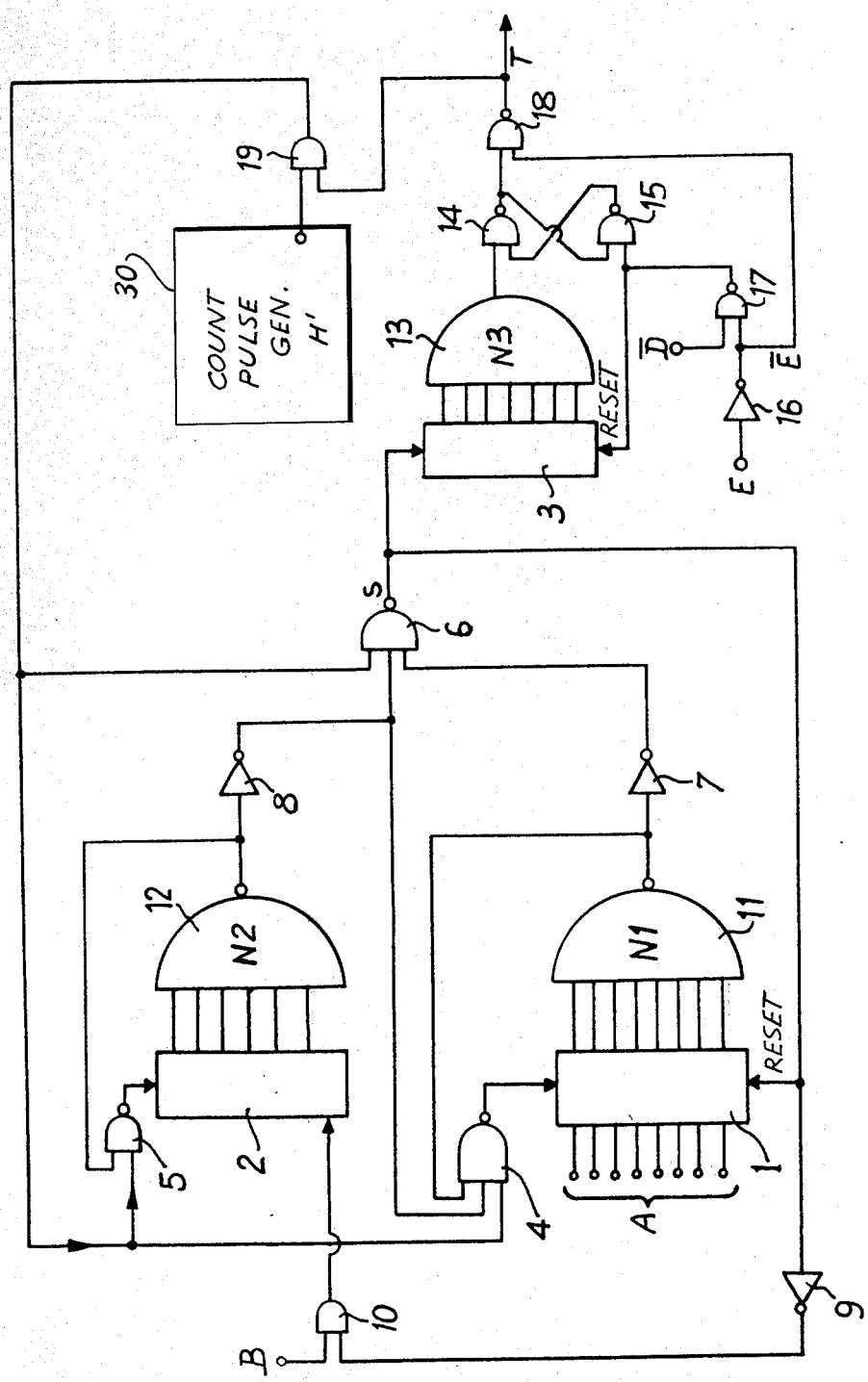

CONTROL APPARATUS AND PROCESS FOR COMBUSTION ENGINES

The invention concerns a control process and apparatus for combustion engines, particularly for motor vehicles.

In French Pat. No. 72 43329, corresponding to U.S. application Ser. No. 422,062, filed Dec. 5, 1973, now U.S. Pat. No. 3,904,856, granted Sept. 9, 1975, a control apparatus and process for combustion engines is described in which the data furnished by pickups measuring physical quantities connected with the operation of the engine are coded in the form of word segments which are grouped to form a first word. The first word is converted by a programmed memory into a second word which is itself transformed into a linear engine-regulating function. This linear regulating function permits adjusting the fuel injection time, for example. In this system, the transformation of the second word into a regulating function occurs in analog form, and the corresponding electronic device for making the transformation is relatively expensive.

In order to avoid this disadvantage, the invention has for its object a control apparatus and process for combustion engines in which a regulating function, for example one capable of defining a duration of the fuel injection, is coded in numerical form to constitute a word. In accordance with the invention, the duration of the regulating function signal is determined by pulse counting means formed by at least two counters. The first counter counts a variable number of pulses determined by the word representing the regulating function, and the other assures a summation to determine a mean value.

An embodiment of the invention applied to the case of a fuel injection control is described below with reference to the annexed drawing in which an electric diagram of the control device is shown which lends itself to construction in the form of an integrated circuit.

A first counter 1 receives at its inputs symbolized at A the word corresponding to the regulating function sought for the engine. This word defines a number N1 representing the value of the word, which can be, for example, between zero and several hundred. That is, data word A, sets the number N1 to which counter 11 will count before it produces an output signal. This type of circuit is called a programmed counter. A counter of this type is disclosed in the aforesaid U.S. Pat. No. 3,904,856. Word A can be produced by any suitable device, for example, one or more transducers which are measuring one or more operating parameters of the engine. These measured parameters are used either directly to produce A, after conversion to binary form, or A is produced by a computer (not shown) in response thereto.

An output circuit 11 of the first counter 1 changes its output state when the number N1 is reached. Circuit 11 can be, for example, any combination of gates, counters, matrixes, or other conventional devices which are wired or programmed or controlled from a remote source to perform this function. Circuit 11 is represented as a NAND gate.

A second counter 2 of the serial input pulses type is provided which is set to count a number N2 of pulses, for example between zero and about one hundred. When this number is reached, the output state of a circuit 12 connected to counter 2 changes.

A third counter 3 of the serial input pulsetype is provided which is set to count a number N3 of pulses of the order of a hundred. An output circuit 13 connected to counter N3 changes its output state when this number N3 is reached. Circuits 12 and 13 are also conventional and of the same type as circuit 11. Circuit 12 is generally represented as a NAND gate and 13 as an AND gate.

The counters 1 and 2 are supplied clock pulses of frequency H' from a source designated generally by the circuit 30 through an electronic AND type gate 19, and two electronic NAND type gates 4 and 5, respectively. The source 30 for the H' pulses can be, for example, a clock pulse generator or else a source of variable frequency pulses, for example, which depend upon another operating parameter of the motor.

Gate 4 feeding counter 1 receives pulses H' and it also receives at other inputs a signal representing the output state of circuit 11, and a signal representing the inverted output state of circuit 12. The latter is provided through an inverter 8.

Gate 5 receives the pulses H' at one input and at its other input it receives a signal representing the output state of circuit 12.

An electronic NAND type gate 6 receives at one input the clock pulses H' and at its other two inputs signals representing the inverted output states of the two circuits 11 and 12. The latter signals are produced by inverters 7 and 8, respectively.

The output signal S of the electronic NAND gate 6 is applied to the third counter 3. It is also applied to a zero reset input of the first counter 1 and, through an inverter 9 and an AND type gate 10, to the zero reset input of the second counter 2. Gate 10 receives a signal B on its other input which, for certain particular engine running conditions, is capable of stopping the counter 2.

The signal delivered by the output circuit 13 is applied to one input of a bistable flip-flop 14–15, whose other input receives a release signal E through an inverter 16 and a NAND gate 17. NAND gate 17 also receives a signal $\bar{D}$ from the starting circuit of the engine (not shown), capable of causing the release of an injection as the engine starts, for example. The $\bar{D}$ and $\bar{E}$ signals at the input of NAND 17 produce an E signal at its output.

The release signal E present at the output of gate 17 is applied also as the zero reset input of counter 3. The signal $\bar{E}$ delivered by the inverter 16 and the output signal of the bistable flip-flop 14–15 are applied to a NAND gate 18 which delivers the injection time signal T to the injection control circuit, for example. This signal is applied also to an AND gate 19, which receives the pulses H' at its other input.

The operation of the device is analyzed as follows, the signals at B and $\bar{D}$ being assumed present, the counters 1 and 2 having been reset to zero by the last pulse issuing at S.

The injection release signal E is produced, and its inverse $\bar{E}$ is applied to AND gate 18 and to NAND gate 17. A signal E is applied, therefore, on the one hand to counter 3 from gate 17 to reset it to zero, and on the other to flip-flop 14–15 to flip it to a first stable state in which the output of 14 is at the same level as E. The output signal of the flip-flop then passes through NAND gate 18 and controls the start of injection. It is also applied to gate 19 and permits the passage of the pulses H'.

The H' pulses cannot pass gate 6 at this time because the output states of circuits 11 and 12 which are inverted by 7 and 8 prevent this. They also cannot pass gate 4 because of the output state of circuit 12 and its inverter 8. They can pass only gate 5 to counter 2 which counts the H' (inverted through NAND 5) pulses to the predetermined value N2. When the N2 count is reached, NAND type circuit 12 changes its output state, thereby closing gate 5 and opening gate 4. The H' pulses (inverted through NAND 4) are then counted by counter 1 to the number N1. Output circuit 11 then changes state, closing gate 4 and opening gate 6. The following H' pulse then passes gate 6 and resets both counters 1 and 2 to zero and is also counted by counter 3.

When counters 1 and 2 are reset to zero, gate 6 is closed. Counters 1 and 2 cycle again to produce counts N2 and N1 of the H' pulses. This again opens gate 6 to pass H' pulses which are passed to counter 3 and is used to again reset counters 1 and 2.

The operation repeats until counter 3 has counted N3 pulses. Its output state then changes to produce a signal to return flip-flop 14–15 to its initial state terminating the period during which the T pulse was produced. The output signal of circuit 13 is therefore the end-of-injection signal, the duration of the rectangular wave T defining the duration of the injection. The cycle starts over again when the injection release signal E (end of injection) is produced.

That duration is determined from the period T' of the pulses of frequency H'. In fact, the pulses which pass gate 6 have a period $S = T'(N1 + N2)$, and the duration of the rectangular wave is:

$$T = \sum^{N3} S.$$

In fact, as the number N1 can vary as a function of the input word A, the duration of the rectangular wave is obtained by summation of the values of S and a mean value can thus be maintained.

The duration T of the injection is therefore determined by numerical means with good precision, because a mean value is maintained.

As the word A applied to counter 1 can correspond to a very low value, which can be close to zero, the determination of the injection time T might be difficult in the absence of counter 2. COunter 2 permits providing a duration threshold, determined by N2, regardless of the values of N1 imposed by the word A.

Under special conditions of operation of the engine, the role of the second counter 2 can, however, be suppressed temporarily. It suffices to send at B a signal to cut off the second counter. The first counter then counts the pulses H' directly without intervention of the threshold connected with the second counter 2. By this arrangement particularly short injection times can be determined.

In case a starting injection is triggered by the signal D, the flip-flop 14–15 forbids the doubling of this injection by a signal E.

The apparatus described constitutes an element of the injection time calculator using only numerical (digital) means. Therefore, it can be realized in the form of a digital integrated circuit since no analog components are necessary.

The above described example relates to the determination of an injection time, but the invention applies equally to the determination of the ignition or any other control signal of a combustion engine.

What is claimed is:

1. Apparatus for producing a regulating function signal of a given duration for controlling the fuel supply system of a combustion engine in response to a coded word defining the duration of said signal comprising:

means for producing counting signals, first counter means receiving said counting signals and having a predetermined count set therein by said coded word, said first counter means defining a first predetermined period when said predetermined count is reached, second counter means for receiving a predetermined number of said counting signals to produce a second predetermined period, third counter means, and first means responsive to the sum of said first and said second predetermined periods as determined by said first and second counter means for providing a said counting signal to said third counter means upon each termination of said first and second predetermined periods established by said first and second counter means, said third counter means counting a predetermined number of said counting signals representative of a predetermined number of said first and second periods to establish said given duration for said control signal.

2. Apparatus as in claim 1 further comprising means responsive to each counting signal provided to said third counter means to reset said first counter means.

3. Apparatus as in claim 1 further comprising means responsive to each counting signal provided to said third counter means to reset both said first and second counter means.

4. Apparatus as in claim 1 further comprising means for disabling said second counter means so that said first means is responsive only to the period determined by said first counter means.

5. Apparatus as in claim 1 further comprising means for resetting said third counter means.

* * * * *